United States Patent [19]
Thurman

[11] 3,751,925
[45] Aug. 14, 1973

[54] FLOATING OIL CONTAINMENT BOOM

[75] Inventor: Robert K. Thurman, Linwood, Wash.

[73] Assignee: Merritt Division of Murphy Pacific Marine Salvage Company, New York, N.Y.

[22] Filed: Oct. 7, 1970

[21] Appl. No.: 78,801

[52] U.S. Cl. ................................................ 61/1 F
[51] Int. Cl. .............................................. E02b 15/04
[58] Field of Search .................. 61/1 F, 5; 210/242; 9/11 R; 114/.5 F

[56] References Cited
UNITED STATES PATENTS

| | | | |
|---|---|---|---|
| 961,459 | 6/1910 | Ray | 9/11 R |
| 2,962,996 | 12/1960 | Smith | 114/.5 F |
| 3,109,183 | 11/1963 | Overmeyer | 114/.5 F |
| 3,499,290 | 3/1970 | Smith | 61/1 F |
| 3,592,008 | 7/1971 | Trindle | 61/5 |
| 3,184,923 | 5/1965 | Galvaing | 61/1 F |

*Primary Examiner*—Peter M. Caun
*Attorney*—Brumbaugh, Graves, Donohue & Raymond

[57] ABSTRACT

A floating boom for containing oil and the like spilled on a body of water comprises a plurality of interconnected, floating units each supporting a rigid vertical barrier with a part above water and a part submerged. The barriers are interconnected by panels of flexible waterproof material of substantially the same vertical extent as the barriers and both the barriers and the interconnecting panels have flexible, waterproof skirt portions depending below the barriers. Each of the units is secured to a tow line by means of which the boom may be towed to a desired location and there anchored in place.

9 Claims, 3 Drawing Figures

Patented Aug. 14, 1973

3,751,925

INVENTOR.
ROBERT K. THURMAN

BY Brumbaugh, Graves, Donohue & Raymond his ATTORNEYS.

FLOATING OIL CONTAINMENT BOOM

BACKGROUND OF THE INVENTION

This invention relates to equipment for containing oil and the like that has been spilled on the surface of a body of water, and more particularly to a novel floating boom which is capable of accomplishing this result in a simple yet highly effective manner.

The widespread use in recent years of large ocean going tankers for transporting oil has greatly increased the likelihood of oil spillages of substantial magnitude. Only recently several such spillages have occurred resulting in extensive pollution of beaches and the creation of serious fire hazards. While oil containment booms have been proposed heretofore for controlling such oil spillages, none of them has the capability of effectively controlling and containing oil spills of this magnitude under the difficult conditions of wind and waves usually prevailing.

SUMMARY OF THE INVENTION

It is an object of the invention, accordingly, to provide a new and improved floating containment boom for spilled oil and the like which is free from the above noted deficiencies of the equipment available heretofore.

A further object of the invention is to provide a floating containment boom of the above character which is capable of effectively containing oil or the like spilled on a body of water under conditions of wind and waves.

Another object of the invention is to provide a floating containment boom of the above character which can be constructed from readily available standard components.

These and other objects of the invention are attained by providing a containment boom comprising a plurality of floating barrier units connected by flexible joints. Each unit comprises a rigid, flat barrier member provided with flotation means such as ordinary metal drums, for example, for supporting it in vertical position in a body of water with part extending above the water surface and part submerged. Secured between adjacent units are flexible panels preferably made of waterproof textile material, which may extend below the barrier members to register with flexible curtains of the same material attached to the bottoms of the barrier members and weighted to keep them flat. Each unit is secured to strong lines which carry the stresses applied in towing or in heavy seas and the leading unit in tow may be provided with a bow plane or like element to facilitate towing an assembly of units to or from a working location.

BRIEF DESCRIPTION OF THE DRAWING

The invention may be better understood from the following detailed description of a preferred embodiment, taken in conjunction with the accompanying drawings in which.

DESCRIPTION OF THE PREFERRED EMBODIMENT

Figure 1:
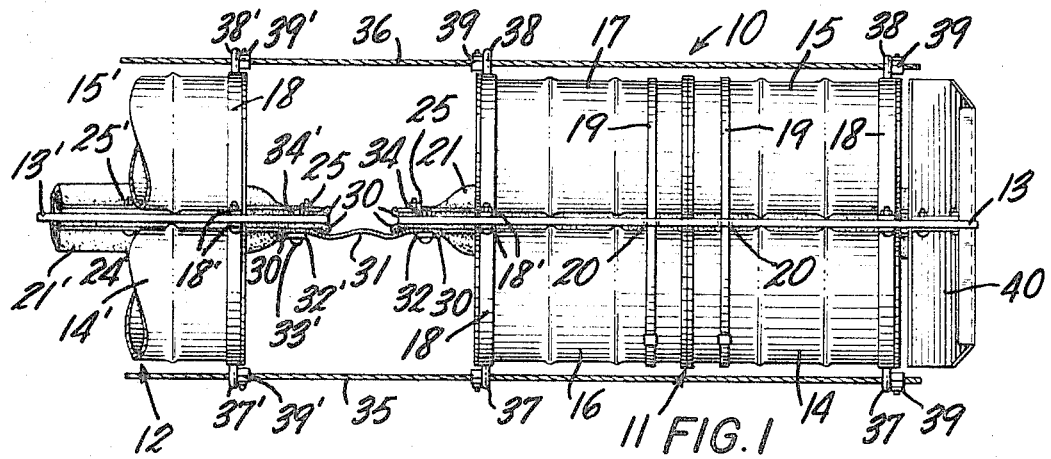
FIG. 1 is a plan view of several adjacent containment boom barrier units constructed according to the invention.
Figure 2:
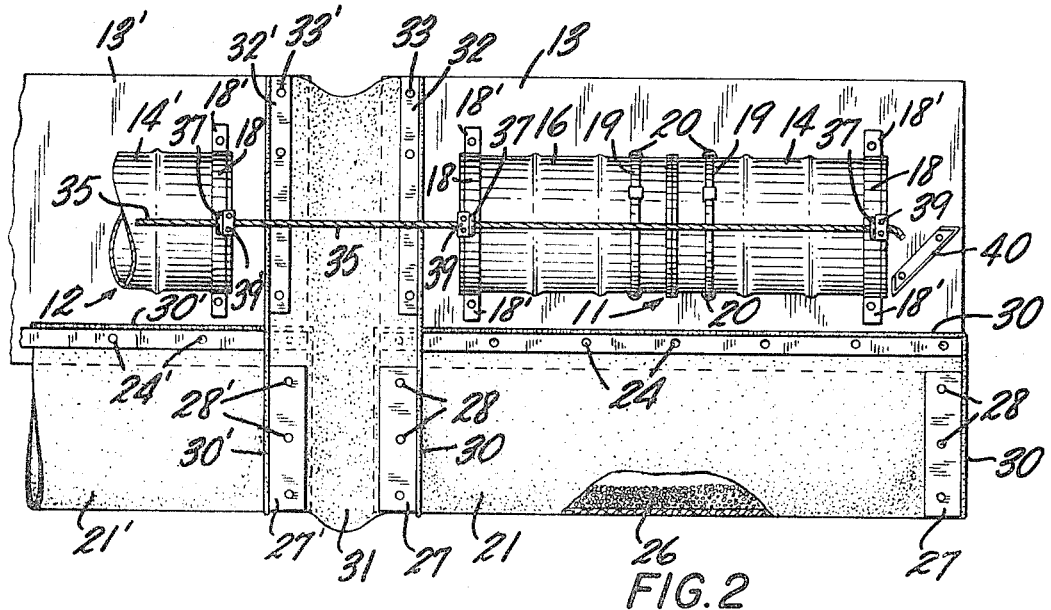
FIGS. 2 and 3, respectively, are side and front views of the barrier units shown in FIG. 1.

Referring first to FIG. 1, part of a containment boom 10 according to the invention is shown which comprises adjacent interconnected units 11 and 12. The units are substantially identical and it will be necessary to describe only the unit 11 in detail, corresponding parts of the unit 12 being designated by primed reference characters. As best shown in FIG. 2, the unit 11 comprises a vertically disposed barrier member 13 which may be a standard 4 feet by 8 feet piece of marine plywood.

Mounted on opposite sides of the barrier member 13 are flotation means such as a plurality of sealed, empty drums 14, 15, 16 and 17. The front ends of the drums 14 and 15 and the rear ends of the drums 16 and 17 are secured to the barrier member 13 by U-shaped clamps 18 having flanges 18 bolted to the barrier member 13 as shown. The adjacent ends of the drums 14 and 16 and the adjacent ends of the drums 15 and 17 are also secured to the barrier member 13 by tight, endless steel bands 19 passing through holes 20 in the barrier member 13 as shown in FIGS. 1 and 2, one band 19 being tightly wrapped around the drums 14 and 15 and the other embracing the drums 16 and 17.

Figure 3:
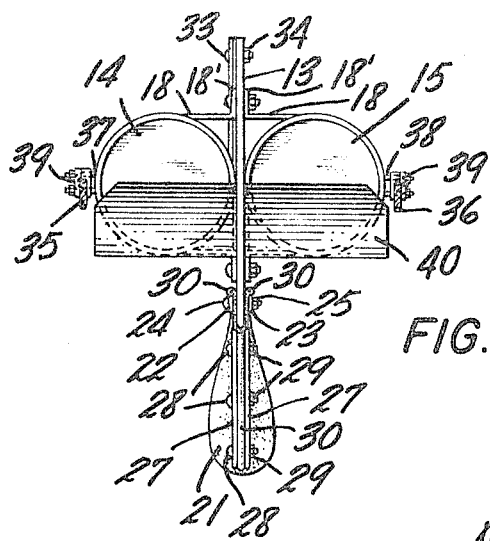

Secured at the lower edge of the barrier member 13 is a skirt 21 formed by folding a rectangular sheet of flexible textile material such as plasticized canvas substantially in half. The skirt 21 is positioned with the lower end of the barrier member 13 sandwiched between the free ends of the folded sheet as shown in FIG. 3. Narrow strips 22 and 23 of marine plywood are placed over the free ends of the sheet and the whole assembly is secured to the barrier member by bolts 24 and nuts 25. A suitable quantity of ballast 26 such as sand, gravel or scrap pipe is placed within the skirt 21 and the ends are clamped between short strips 27 of marine plywood secured together by bolts 28 and nuts 29. Preferably, the skirt 21 has a bead 30 formed at the upper end of each fold as shown in FIG. 3 to prevent it from slipping under the corresponding clamping strip 27.

As shown in FIGS. 1 and 2, the barrier members 13 and 13' of adjacent units 11 and 12, respectively, are connected by flexible panels 31 of textile material such as plasticized canvas which extend from the tops of the barrier members 13 and 13' to the bottoms of the skirts 21 and 21'. The upper portion of each panel 31 is secured to the adjacent ends of the barrier members 13 and 13' by flat clamping strips 32 and 32' secured by bolts 33 and nuts 34. The lower portion of each panel 31 is secured to the adjacent edges of the skirts 21 and 21' by the clamping strips 27.

The units 10 and 11 are secured to towing lines 35 and 36 in such fashion that the towing loads are not applied to the flexible panels 31 interconnecting the units. Thus, the lines 35 and 36 pass through eyes 37 and 38, respectively, on the unit 10 which are formed on the drum clamps 18 and 19 at both outboard corners of both ends of each float 10, as shown in FIGS. 1 and 3. Also, wire clamps 39 are secured to the lines 35 and 36 adjacent the eyes 37 and 38 so that for either direction of tow, the tow lines 35 and 36 carry the towing loads while the connecting panels 31 between the units remain loose and unstressed.

To facilitate towing, sloping bow plane means 40 may be secured to the forward end of the barrier member 13 of the lead unit 11, as shown in FIGS. 1–3, inclusive.

In use, the boom will comprise as many units as required to contain the spilled oil or other liquid and to prevent it from spreading. Depending upon conditions, the free ends of the boom may be secured to fixed objects such as a pier and the boom may be maintained in any desired configuration by means of anchors secured at spaced locations therealong. In other applications, the free ends of the boom may also be anchored, or they may be secured to the sides of a damaged vessel which is leaking oil.

The invention thus provides a novel and highly effective boom for containing substances such as oil spilled on the surface of the body of water. By virtue of the construction described above, the units forming the boom are capable of vertical and horizontal relative movement sufficient to maintain the functional integrity of the boom under conditions of wind and waves. Also, the rigid barrier members produce eddies in the water which tend to urge spilled oil or the like away from the units so that there is no leakage of oil under the units. The boom, moreover, is simple in design and may be constructed from readily available materials.

It will be understood that the specific illustrative embodiment described above is susceptible of modification in form and detail within the spirit of the invention. The invention, accordingly, is not to be limited to that embodiment but encompasses all modifications falling within the scope of the following claims.

I claim:

1. A floating boom for containing oil and the like on the surface of a body of water comprising
   a. a plurality of units disposed end to end each comprising
      i. a rigid barrier member and
      ii. flotation means supporting said barrier member on both sides thereof in substantially vertical position with a portion extending above the water surface and another portion submerged,
   b. a panel of flexible waterproof material interposed between and secured to the adjacent ends of adjacent units,
   c. and linking means horizontally separated on opposite sides of said barrier members and secured to the outboard extremities of said flotation means for linking said units for towing and mooring as a unit without stressing said panels.

2. A floating boom as in claim 1 together with a skirt of flexible material depending from each barrier member, the panels between adjacent barrier members also extending between adjacent skirts and being secured thereto.

3. A floating boom as in claim 2 in which the skirt depending from each barrier member carries ballast.

4. A floating boom as in claim 3, wherein:
   each barrier member comprises a thin rectangular sheet of rigid material;
   the flotation means comprise sealed drums rigidly secured to said barrier member and disposed on opposite sides thereof; and
   the linking means are attached to the fore and aft outboard portions of the drums.

5. A floating boom as in claim 4 together with bow plane means secured to the lead unit thereof to facilitate towing of the boom.

6. A floating boom as in claim 1, wherein:
   each barrier member includes a thin sheet of rigid material;
   the flotation means includes sealed drums rigidly secured to said barrier member and disposed on opposite sides thereof; and
   the linking means includes
   a tow line secured to the drums on each side of the barrier members.

7. A float unit as defined in claim 6 together with bow plane means secured at one end of the unit to facilitate towing the unit while floating in water.

8. A float unit for a containment boom for containing oil and the like on the surface of a body of water, comprising
   a. a rigid barrier member including a thin rectangular sheet of rigid material, and
   b. flotation means adapted to support said barrier member in substantially vertical position with a portion extending above a water surface and another portion submerged, including at least one sealed drum rigidly secured to each side of said sheet,
   c. a panel of flexible waterproof material connected to at least one end of said rigid barrier member for forming a flexible barrier panel between adjacent float units when a plurality of said units are connected together as an oil containment boom, and
   d. a cable securing means secured to each outboard corner of each end of said float units connecting a cable for linking a plurality of said float units together for rowing and mooring as an oil containment boom without stressing said flexible barrier panel.

9. A float unit as defined in claim 8, together with a skirt of flexible material depending from the barrier member and carrying ballast.

* * * * *

PO-1050
(5/69)

UNITED STATES PATENT OFFICE
CERTIFICATE OF CORRECTION

Patent No. 3,751,925     Dated August 14, 1973

Inventor(s)  Robert K. Thurman

It is certified that error appears in the above-identified patent and that said Letters Patent are hereby corrected as shown below:

[75] Inventor's address should be --Gretna, Louisiana--.

Column 2, line 15, "18" second occurrence should be --18'--.

Column 4, line 22, "float unit" should be --floating boom--;
line 23, "unit" should be --boom--;
line 42, "units" should be --unit for--;
line 44, "rowing" should be --towing--.

Signed and sealed this 1st day of January 1974.

(SEAL)
Attest:

EDWARD M. FLETCHER, JR.
Attesting Officer

RENE D. TEGTMEYER
Acting Commissioner of Patents